May 20, 1969     A. GREENBERG ET AL     3,444,569
AIR-SEA RESCUE DEVICE WITH FLOATATION COLLAR
Filed June 21, 1967     Sheet _1_ of 2
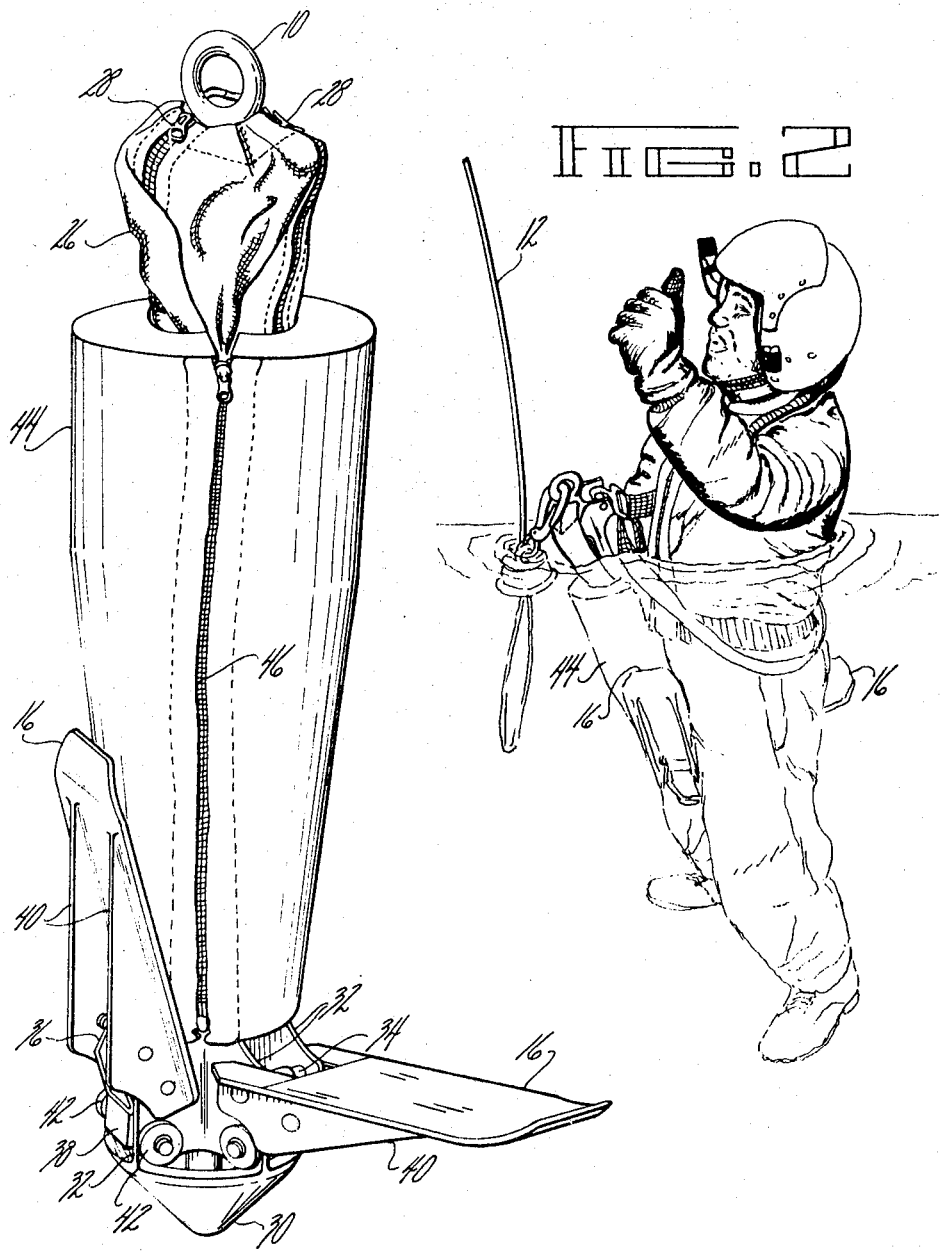
INVENTORS
AVROM GREENBERG
WILLIAM H. BROWN, JR.
CLIFFORD B. PACKARD
GEORGE I. HACKENBERGER JR
BY McCormick, Paulding & Huber
ATTORNEYS May 20, 1969     A. GREENBERG ET AL     3,444,569
AIR-SEA RESCUE DEVICE WITH FLOATATION COLLAR
Filed June 21, 1967                                   Sheet 2 of 2

3,444,569
**AIR-SEA RESCUE DEVICE WITH
FLOTATION COLLAR**
Avrom Greenberg, Granby, William H. Brown, Jr., Suffield, Clifford B. Packard, South Glastonbury, and George I. Hackenberger, Jr., Suffield, Conn., assignors to Kaman Corporation, Bloomfield, Conn., a corporation of Connecticut
Filed June 21, 1967, Ser. No. 647,647
Int. Cl. B63c 9/08; E04g 3/10
U.S. Cl. 9—14                                               4 Claims

ABSTRACT OF THE DISCLOSURE

A rescue device having three seats pivotally mounted at the lower end of a shank portion and an eye at the upper end thereof for receiving the hook normally provided on a conventional helicopter hoist cable. A safety strap for each seat is stowed in a fabric cover at the upper end of the shank portion and an annular flotation collar is provided between the fabric cover and the pivoted seats. The collar is split and has a zipper which can be opened to remove the collar from the shank portion.

Summary of invention

This invention relates to air-sea rescue devices for use with a helicopter hoist cable, and deals more particularly with an air-sea rescue device which is made in substantial part of metal, but which is provided with a flotation collar to facilitate helicopter pick-ups at sea.

The general object of the present invention is to provide a removable flotation collar for a rescue device of the type which is adapted for use with a helicopter hoist cable.

A more specific object of the present invention is to provide a removable flotation collar for a rescue device having several seats pivotally carried at its lower end, and safety straps stowed in its upper end, said seats being movable, and said straps being useable without interfering with said collar.

Brief description of drawings

FIG. 1 is a perspective view of an air-sea rescue device constructed in accordance with the present invention, showing one seat deployed and another stowed.

FIG. 2 is a perspective view of the device shown in FIG. 1 as it would be used in rescuing an airman at sea.

Detailed description of the drawings

Figure 3:
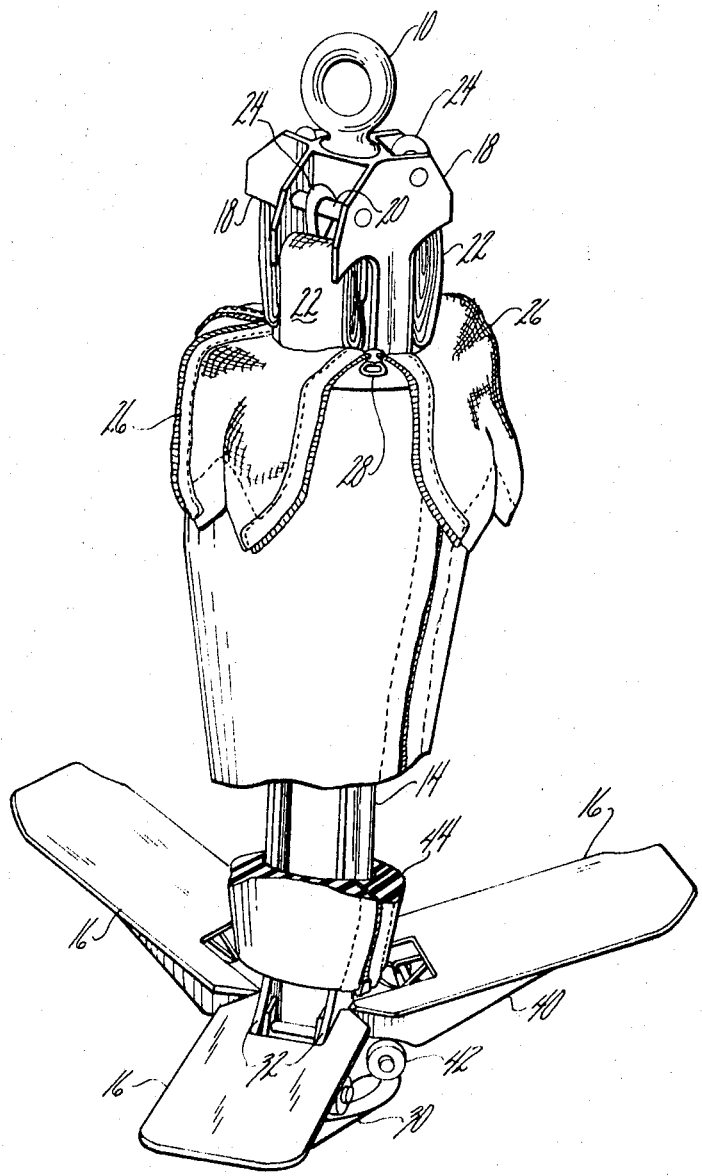
FIG. 3 is a perspective view of the device shown in FIG. 1 with the strap covers opened to reveal the safety straps in their stowed configuration, and with the flotation collar broken away in part to reveal the shank portion of the device.

Referring now to the drawings in greater detail, FIG. 1 shows an air-sea rescue device constructed in accordance with the present invention, and having an eye 10 at its upper end which will permit the device to be suspended by a hoist cable 12 (best shown in FIG. 2) of the type which is commonly utilized on conventional helicopters. As is best shown in FIG. 3, the device includes a generally vertically disposed shank portion 14 having an upper end to which the eye 10 is attached, and a lower end to which three seats 16, 16 are pivotally mounted for movement between the deployed position shown in FIG. 3 and the stowed position shown in FIG. 1.

The upper end of the shank portion 14 further includes radially outwardly extending webs 18, 18, which are arranged in three pairs with a pin 20 disposed between each pair. Thus three pins are provided corresponding to the three seats 16, 16 respectively. A safety strap 22 is associated with each seat 16, one end of said strap being connected to the shank portion 14 adjacent the upper end thereof, and the other end carrying a snap type hook 24 which is adapted to releasably engage the pin 20. As so constructed, the rescue can easily release the hook 24 from the pin 20 and encircle the strap 22 generally around his waist, after which the hook can be re-engaged with the pin so as to hold the rescue to the device as best shown in FIG. 2. It will of course be apparent that although only one person is shown on the seat 16 in FIG. 2, two additional persons can be accommoated on the remaining pair of seats 16, 16 which are folded, or stowed in this view.

It is an important feature of the present invention that the safety straps 22, 22 and the seats 16, 16 can be stowed in positions wherein they lie adjacent the shank portion 14 of the device in order to reduce the cross section size, or profile, of the device so that it can be lowered through overhanging tree branches or similar obstructions when conducting rescue operations. In keeping with the foregoing objective, a fabric cover 26 is provided for enclosing the folded straps 22, 22 (best shown in FIG. 3) and three zippers 28, 28 are provided on the fabric cover 26 to permit pealing the cover from the position shown in FIG. 1 to that shown in FIG. 3 so as to permit removal of the straps for use.

Considering next the construction of the lower end of the device, FIG. 1 shows a generally conically shaped nose section 30 which serves primarily to avoid entanglement of the seat structure with undergrowth or the like, and also to prevent the device from becoming anchored in soft earth or the like in the event that the rescue device is used over swampy terrain. A plurality of radially outwardly extending webs 32, 32 are arranged in pairs with a pivot pin 34 being provided between each such pair of webs for pivotally receiving an associated seat 16. Each seat 16 has associated therewith a spring member 36 located between the seat 16 and the lower end of the shank portion 14 to urge the seat 16 into the stowed configuration shown in FIG. 1. Each seat 16 can be moved from the stowed positions shown to the deployed position by grasping the outer end thereof and pivoting the same downwardly until a lower U-shaped portion of the spring 36 snaps over the stop 38 provided for this purpose adjacent the lower end of the shank portion. Similarly, the seat 16 can be returned to its stowed position by inserting one's thumb into the recess beneath the seat and depressing the stop 38 while at the same time pushing downward slightly on the seat to relieve pressure on the spring 36. In this manner the seat 16 can be manually moved past the stop and returned to the stowed position. From FIG. 1 it will be seen that each seat includes depending webs 40, 40 each of which is adapted to engage a stop or abutment 42 provided for this purpose on the radially outwardly extending web 32, 32.

In further accordance with the present invention, a floatation collar 44 is provided around the shank portion 14 of the device so that upon lowering of the device into water, as shown in FIG. 2, the device will float on the surface facilitating efforts at rescuing a downed airman or the like. Preferably, and as best shown in FIG. 1, the collar 44 is annular in cross section being split on one side, or having an opening on one side, which is adapted to be releasably closed by means of the zipper 46. The annular collar 44 preferably extends from the lower end of the shank portion 14 adjacent the pivoted end of the seats 16, 16 to a point spaced below the upper end of the shank 14, which point is spaced downwardly so as to permit ready removal of the stowed straps 22, 22. The annular collar 44 is preferably fabricated from a synthetic cellular material such as polyurethane, or other expanded closed pore type material. Another material which has been found satisfactory is Ensolite, a material manufactured by the United States Rubber Company. Still with reference to FIG. 1 the zipper 36 will be seen to have one portion which is carried on a web 48, the web being adhesively secured to the outer surface of the collar adjacent the slot, or opening defining portion thereof. A corresponding zipper portion is attached to the corresponding opposite exterior surface of the collar adjacent said slot, or opening in the collar 44. As so constructed and arranged, the zipper 46 can be readily unfastened exposing the radially extending slot, or opening in the collar 44, and as a result of the resiliency of the material from which the collar 44 is made, the collar can be deformed slightly and hence readily removed from the device. By the same token, the device can be readily re-equipped or reassembled with the collar 44 in a relatively simple procedure which involves deforming the collar slightly and placing it around the shank portion 14 after which the zipper 48 is refastened.

From the foregoing description it will be apparent that the resuce device can be used either with or without the floatation collar. The device without the collar will be especially useful for penetrating overhanging trees and the like where the possibility of swampy terrain does not exist. With the collar installed the device can be used for rescue operations at sea, or for rescue work over swampy terrain where trees and other obstructions present entanglement hazards for most prior art rescue slings. In short, the collar permits a rescue helicopter to carry only one type of device for use in conducting rescue operations over a wide variety of terrain conditions.

We claim:
1. An air-sea rescue device for use with a cable suspended from a hovering aircraft, said device comprising a shank portion having an upper end adapted for connection to a cable as aforesaid, and also having a lower end, at least one seat pivotally connected to said lower end for movement between a stowed position alongside said shank portion and a deployed position wherein said seat extends laterally outwardly at substantially 90° with respect to said shank portion, a floatation collar for said shank portion to float the device when immersed in water, strap means associated with said shank upper end portion for securing a person to be rescued on said deployed seat, means for stowing said strap means to said shank upper end portion, said floatation collar being annular in cross section and extending from the lower end of said shank portion to a point spaced below the upper end thereof to permit ready removal of said stowed strap means without interfering with said collar.

2. An air-sea rescue device as set forth in claim 1 wherein said floatation collar is made from a resilient cellular material having an opening extending the entire length thereof to permit the collar to be spread along said opening for ease in assembly with said shank portion.

3. An air-sea rescue device as set forth in claim 2 wherein said floatation collar further includes releasable means for holding said opening closed.

4. A air-sea rescue device as set forth in claim 3 wherein said releasable means comprises a zipper.

References Cited

UNITED STATES PATENTS

| | | | |
|---|---|---|---|
| 2,145,289 | 1/1939 | Bourdeaux | 9—340 |
| 2,700,781 | 2/1955 | Smith | 9—14 |
| 2,950,489 | 8/1960 | Pattison | 9—340 |
| 3,036,315 | 5/1962 | Karnow | 9—14 |
| 3,215,111 | 11/1965 | McDaniel | 114—208 |

FOREIGN PATENTS

| | | |
|---|---|---|
| 625,310 | 9/1961 | Italy. |
| 1,117,043 | 2/1956 | France. |

FERGUS S. MIDDLETON, *Primary Examiner.*

J. L. FORMAN, *Assistant Examiner.*

U.S. Cl. X.R.

182—142